United States Patent Office 3,455,682
Patented July 15, 1969

3,455,682
ISOTATIC HOT PRESSING OF REFRACTORY BODIES
Glen D. Barbaras, Wilmington, Del., assignor to E. I. du Pont de Nemours and Company, Wilmington, Del., a corporation of Delaware
No Drawing. Filed July 31, 1967, Ser. No. 657,039
Int. Cl. B22f 3/16, 3/26
U.S. Cl. 25—204      15 Claims

ABSTRACT OF THE DISCLOSURE

A powdered refractory material is formed into a billet by compacting the powder and sintering the resulting compact. The sintered billet is placed in a hot pressing mold where it is surrounded with an intimate mixture of a first component selected from alkali and alkaline earth metal chlorides, fluorides and silicates and mixtures thereof and a finely divided second component selected from silica, alumina, zirconia, magnesia, calcium oxide, spinels, mullite, anhydrous alumino-silicates and mixtures thereof which are solid at the hot pressing temperature to be employed. The billet and surrounding mixture are then heated to a temperature at which the mixture is plastic, and while maintaining that temperature, pressure is applied to the mixture, thereby isostatically hot pressing the billet. A sufficient quantity of the first component must be present so that the mixture becomes plastic at the hot pressing temperature. The mixture will ordinarily contain from 5% to 40% by weight of the first component and from 60% to 95% of the second component. Hot pressing temperatures of from 1,000 to 2,000° C. and pressures of from 400 to 6,000 p.s.i. are representative.

BACKGROUND OF THE INVENTION

This invention relates to the production of high density refractory bodies. Such refractory bodies possess superior hardness, toughness, strength, wear-resistance and chemical resistance and exhibit superior performance as cutting edges for machining high strength alloys, drilling rocks, cutting or shaping other hard materials, as high-temperature fixtures or structural materials and as wear, abrasion and chemical resistant parts, particularly at high temperatures, for example, in certain chemical reactors.

Methods heretofore utilized to produce such articles have generally involved hot pressing of a powdered or compacted sample in a close fitting, rigid mold or isostatically hot pressing a sealed, deformable container containing a powdered or compacted sample utilizing a gas as the pressure-transmitting medium. In both of these methods the sample, whether originally a powder or a compact, assumes the shape of the mold or deformed container.

Several notable problems are encountered when the above methods are used. The sizes and shapes of articles that can be produced are limited. Finished articles having complex shapes often contain undesirable density gradients because of non-uniform pressure distribution during pressing. Also, each sample must be compressed in a separate mold or container and after hot pressing the sample often adheres to the mold or container during separation.

Isostatic pressing of self-sustaining compacts has been suggested as a possible method of overcoming the above-mentioned problems. For example, Ballard and Hendricks in U.S. Patent 3,279,917, propose the use of a particulate material such as powdered glass or natural flake graphite as a pressure-transmitting medium in the hot pressing of refractory bodies. In this method the particulate pressure-transmitting medium does not conform completely to the sample and as a consequence, pressure is still not transmitted uniformly and truly isostatically. Various shapes such as cubes, round rods and the like are distorted when pressure is applied. It is virtually impossible to form intricate contours by this method.

SUMMARY OF THE INVENTION

In summary, this invention relates to an improved method of isostatically hot pressing refractory bodies. This method comprises the following steps:

(a) Surrounding the body with a mixture consisting essentially of from about 5% to about 40% by weight of a first component selected from alkali and alkaline earth metal chlorides, fluorides and silicates and mixtures thereof and from about 60% to about 95% by weight of a second component selected from silica, alumina, zirconia, magnesia, calcium oxide, spinels, mullite, anhydrous alumino silicates and mixtures thereof;

(b) Heating said mixture to a temperature at which it is plastic; and (c) While maintaining said temperature applying to said mixture sufficient pressure to increase the density of said body.

In this manner, low porosity, refractory bodies having a variety of shapes and sizes can be compressed to extremely low porosity and very high density without substantially altering their original shape. This is accomplished because upon the application of pressure the plastic mixture conforms readily to the shapes of the samples, thereby providing uniform pressure transmission.

Very intricate contours such as those in a drill bit are reproduced with essentially no distortion. Also, several samples of widely varying shapes and sizes can be pressed simultaneously in the same mold. This ability to hot press a plurality of samples simultaneously provides a very substantial economic advantage in commercial operations. After hot pressing, samples do not adhere to the pressure-confining walls of the mold because the refractory body is isolated from the mold walls by the substantially inert and impervious pressure-transmitting medium, thereby significantly reducing the incidence of damage to expensive pressing molds and to the product. As used herein, the term "mold" refers to the container which confines the mass under pressure.

DESCRIPTION OF PREFERRED EMBODIMENTS

Refractory bodies

This invention is most advantageously applied to the production of articles from refractory oxides, carbides, nitrides, silicides, borides and sulfides. Among the oxides, for example, are alumina, zirconia, magnesia, mullite, zircon, thoria, beryllia, urania and spinels. Tungsten carbide, tantalum carbide, titanium carbide, niobium carbide, zirconium carbide, hafnium carbide and silicon carbide are representative of the refractory carbides. Exemplary of the nitrides are the nitrides of aluminum, titanium, zirconium, tantalum, hafnium, niobium, boron and silicon. The silicides include those of molybdenum, tungsten, titanium, niobium and chromium. Among the borides are those of titanium, chromium, zirconium, tantalum, molybdenum and tungsten. The sulfides include those of cerium, molybdenum, cadmium, zinc, titanium, magnesium and zirconium.

Mixtures of these refractory materials can also be used or they can be combined with various proportions of metal binders such as cobalt, nickel, iron, tungsten, molybdenum, tantalum, titanium, chromium, and alloys thereof.

The refractory materials or the refractory materials in combination with one or more binder metals are prepared as finely divided powders by any conventional method such as ball milling. These powders which should be comprised of particles having an average diameter of less than fifty microns and preferably less than two micron are then fabricated into bodies having properties suitable for use in the methods of this invention. These bodies are sometimes referred to hereinafter as "billets."

A variety of well-known methods can be used to produce suitable billets from the powders. In one preferred method a sample is charged into a rigid graphite mold, pressure is applied to the sample without applying heat and after releasing the pressure, the resulting compact is sintered in a non-oxidizing environment. The pressure applied will ordinarily be from about 200 p.s.i. to about 10,000 p.s.i. and sintering times are normally held to less than one hour. Sintering temperatures, depending on composition, will usually range from about 1,000 to as high as about 2,000° C.

Instead of using a graphite mold it is often possible to press the refractory powder directly in a conventional steel or tungsten carbide die in a powder metallurgy press. The compressed billet is then ejected from the die and sintered in a conventional sintering furnace under a non-oxidizing environment.

Another procedure involves charging the powder into a thin-walled rubber mold which is evacuated and sealed and then subjected to isostatic pressure in a liquid medium at ambient temperatures and at pressures of from 1,000 to 100,000 p.s.i. The resulting compact is removed from the rubber mold and sintered as described above. This technique is particularly preferred for the production of billets of irregular or intricate shapes.

Sintering in the above-described procedures is preferably continued until the density of the compact reaches at least 60% of theoretical and most preferably at least 90% of theoretical. It also is preferred that substantially all surface pores in the sintered billet be less than 100 microns in diameter. Usually the plastic mixture will not penetrate pores of this diameter to any substantial distance during hot pressing. Penetration to the extent of about 50 mils can, however, be remedied by merely grinding away the outer "skin" of the finished article. If the finished product is to be cut into sections for use, a limited number of even major imperfections can sometimes be tolerated because imperfect sections can merely be discarded. Preferably, substantially all surface pores in the billet are less than 50 microns, and most preferably less than 10 microns in diameter.

To gain the maximum benefit from the method of this invention, the billets should possess the shape desired for the final article since one of the major objectives of this invention is to press under isostatic conditions so that there is little or no distortion of the billet. The shape of the billet will of course be determined by the shape of the mold in which it is produced. Where cylindrical or cubical articles are desired, rigid molds are satisfactory, but where intricate contours are desired, the use of rubber mold as described above, is much more convenient. Billets can, of course, be machined or ground to the shape of the final article desired or can be machined or ground to remove imperfections.

Products having a unique combination of high strength plus hardness making them particularly suitable for metal cutting tool applications are obtained by the methods of this invention when sintered billets are prepared from powders consisting of from about 70% to about 97% by weight of a hard metal carbide selected from tungsten carbide, titanium carbide, tantalum carbide, niobium carbide and mixtures thereof and from about 3% to about 30% by weight of a binder metal selected from iron, cobalt, nickel, molybdenum and alloys thereof. It is preferred that the average particle size of the hard metal carbide and the starting powders be less than one micron. The preferred hard metal carbide is tungsten carbide and the preferred binder metal therefor is cobalt. Preferably the cobalt comprises from about 6% to about 15% by weight of the tungsten carbide-cobalt mixture. Other refractory materials such as carbides, oxides, borides, nitrides and silicides can be present in minor amounts to give desired modifications of physical properties.

The method of this invention is especially suitable for fabricating extremely strong, hard metal-bonded metal carbide bodies from sintered billets in which the ultimate grain size of the metal carbide is less than one-half micron and in which the surface pores are correspondingly finer than one-half micron. Such billets, containing for example, from 88% to 91% by weight of submicron tungsten carbide and from 9% to 12% of cobalt, are impervious to the plastic mixture used in the method of this invention and can be isostatically hot pressed to produce articles having densities over 99% of theoretical, transverse rupture strengths in excess of 470,000 p.s.i. and hardnesses greater than 91.0 Rockwell A, such articles being slightly deficient in carbon in regard to stoichiometric tungsten carbide. Such sintered billets and articles produced therefrom are fully described in U.S. application, Ser. No. 516,825, filed Nov. 24, 1965.

Hot pressing mold

Graphite, tungsten metal and molybdenum metal are highly preferred construction materials for molds and other parts of the pressing apparatus utilized in carrying out the methods of this invention. Obviously, other materials can be employed but preferred materials of construction for the molds and pistons are those which not only have adequate strength at the temperature utilized in the pressing step of the methods of this invention, but also do not react with the pressure-transmitting medium utilized, thereby insuring ready ejection of the compressed mass after cooling. Graphite of low porosity and high strength is most preferred.

Pressure-transmitting medium

The pressure-transmitting media used in the method of this invention are mixtures consisting essentially of from about 5% to about 40% by weight of a first component selected from alkali and alkaline earth metal chlorides, fluorides and silicates and mixtures thereof and from about 60% to 95% by weight of a second component selected from silica, alumina, zirconia, magnesia, calcium oxide, spinels, mullite, anhydrous alumino silicates and mixtures thereof. Mixtures of calcium chloride and calcium oxide are preferred.

These mixtures are solids at room temperature but soften at various temperatures within the range of from about 1,000° C. to about 2,000° C. and are best described as becoming "putty-like" at their respective use temperatures. This property is thought to be due to the presence of the first component, which is a high-melting salt of low volatility, as a liquid phase and the second component, which is a very high melting refractory oxide, as a solid phase, much as conventional putties at room temperature consist of a liquid oil phase and a solid particulate thickener phase. Each of these mixtures maintains its plasticity over a temperature range of about 100° C., making practical its use in an isostatic hot pressing process. A medium consisting of a single component with a sharp melting point or a sharp change in state from an immobile solid to a very fluid liquid would be inoperable in a practical isostatic hot pressing process.

The above mixtures are preferably used in the form of homogeneous, fine powders so that they can be most efficiently packed around the billet to be pressed. This assures that when the mixture is heated to the point where it is plastic, the medium will completely surround the billet. For optimum results, the second component should be finely divided, preferably substantially all will pass through a 100 mesh screen and most preferably through a 325 mesh screen.

The fluidity of the mixture at hot pressing temperatures is of extreme importance. At the hot pressing temperature a medium should be sufficiently fluid so that it conforms to the shape of the billet before any application of pressure or at least at the very first application of pressure. Otherwise, uniform pressure transmission is not obtained and excessive distortion of the billet can result, e.g., flattening of cylindrical billets into oval shapes and bulging of the edges of cubical billets. However, the medium should not be so fluid that it is forced out of the mold through the space between the pistons and the mold; such leakage can cause excessive distortion of the billets and freezing of the pistons of the mold.

As is well known in the art of hot pressing of refractory bodies, the hot pressing temperature that will provide optimum results will depend on the composition of the billet to be pressed. This optimum temperature will ordinarily be between 1,000° C. and 2,000° C. However, since the fluidity of a given mixture used in the methods of this invention usually increases as it is heated above its initial softening point and since the maximum permissible fluidity is governed in part by the porosity of the billet to be pressed, in part by the exactness of the fit between the pistons and the mold used and in part by the amount of pressure applied, it is not possible to indicate one mixture which is preferred or even suitable for all hot pressing conditions. Furthermore, since the absolute viscosity of the mixtures cannot be measured conveniently at high temperatures such as 1,400° C., it is not possible to indicate a viscosity range which is suitable. However, for a given hot pressing temperature of from 1,000° C. to 2,000° C., one can select components and proportions thereof which will provide a mixture having the proper fluidity at that temperature.

Having selected a hot pressing temperature, the first component is chosen on the basis of its melting and boiling points. Since the first component must be in liquid state at the hot pressing temperature, it must have a melting point below the selected temperature and to minimize volatilization of the first component from the mixture, the first component should also have a boiling point substantially above, and preferably at least 100° C. above, the selected temperature. For example, sodium chloride, which melts at 801° C. and boils at 1,413° C., is suitable for use in the 1,000° C. to 1,300° C. temperature range but is not suitable for use above 1,400° C. However, calcium chloride, which melts at 772° C. and boils above 1,600° C., can be used at higher temperatures. Calcium fluoride, which melts at 1,360° C., can be used at 1,400° C. to 2,000° C. The only limitation on the choice of the second component, which must remain solid at the hot pressing temperature, is that it have a melting point above that temperature.

To determine the proportions of the two components to be used in the mixture, it is most convenient to heat a sample containing about 50% of the first component and about 50% of the second component to the projected hot pressing temperature and then begin addition of small amounts of the second component with stirring. As addition of the second component is continued, the mixture changes from a relatively thin liquid to a plastic, putty-like state. This change in state is rather sharp and is easily noticed. When this change occurs, addition of the second components should be stopped. Knowing the amount of the first component used and the total amount of the second component added, the composition of the final mixture is calculated.

To confirm that the proportions of the components so determined will provide the proper viscosity at the selected hot pressing temperature, a powdered mixture having the composition calculated as described above is prepared and 15 grams is cold pressed at 300 p.s.i. in a one-inch diameter graphite mold having graphite pistons inserted in each end. The bottom piston is then replaced with a one-inch long ATJ graphite spacer containing three $\frac{1}{16}$ inch diameter holes running through its length. The bottom piston is then inserted again and the assembly is heated in a vacuum hot press furnace at a rate of about 75° C. per minute to the projected hot pressing temperature, while maintaining a vacuum of at least 0.5 torr. The goal temperature is held for eight minutes and 3,000 p.s.i. pressure is applied for 30 seconds through both pistons and the mold is then immediately removed from the hot press furnace. After the mold cools to ambient temperatures, the lengths of extrusions are measured and the average length is calculated. Experience has shown that if the average length is less then $\frac{1}{8}$ inch or more than $\frac{3}{4}$ inch, the mixture is usually too viscous or too fluid, respectively and that more of one or the other component must be added. However, as pointed out above, the suitable maximum and minimum viscosities will usually depend on the porosity of the billet to be pressed and the hot-pressing apparatus utilized.

In some instances, a mixture which would otherwise penetrate porous billets to an undesirable extent can be used if the billet is first coated with a pressure transmitting medium of high intrinsic viscosity. The coating seals the pores and prevents penetration by the less viscous medium.

Hot pressing conditions

Isostatic hot pressing according to the method of this invention is preferably carried out under vacuum to prevent gases from becoming trapped in the billet or in the pressure transmitting medium.

The mold or confining cavity in which the hot pressing is to be carried out is preferably loaded by first cold pressing a portion of the pressure transmitting medium in the bottom of the mold to provide a base on which to place the billet and to assure that when the medium becomes plastic the billet will not come into contact with the bottom piston. The billet is then centered on the base thus formed and covered with the remainder of the medium. If several billets are to be pressed simultaneously, they are arranged within the mold cavity such that they are separated one from the other by the medium.

The mold is then heated to the temperature at which hot pressing is to be conducted and the mold and its contents are preferably allowed to equilibrate to this temperature. Hot pressing temperatures for refractory bodies generally range from 1,000° C. to 2,000° C. depending on the identity of the refractory material. For billets comprised of refractories and binder metals it is preferable to hot press at a temperature at which the binder metal is a liquid phase in order to obtain rapid densification of the billet. With respect to the method of this invention, the presence of the liquid phase also tends to prevent penetration of the surface pores in the billet by the plastic pressure transmitting medium.

After the billet and the surrounding medium are equilibrated to the selected hot pressing temperature, pressure is applied to the plastic medium and is increased to the maximum pressure. The pressure should not be increased so rapidly that the plastic medium does not have an opportunity to conform to the billet before compression of the billet begins since excessive distortion of the billet can result. The maximum pressure is maintained until the billet and the mixture cease to deform, and is maintained for a short time thereafter in order to assure complete depression. Total time of hot pressing will generally not exceed about ten minutes. Less than complete compression of the billet can of course be obtained if desired.

A rate of pressure increase of less than 500 p.s.i. per second is preferred to assure that the pressure transmitting medium has an opportunity to conform to the billet before the pressure reaches a point at which compression of the billet begins. The maximum and minimum pressures that can be used will be limited by the capabilities of the hot pressing apparatus and the desired degree of compression, respectively. Pressures in excess of 400 p.s.i. are ordinarily necessary to obtain articles of near theoretical density, that is, at least 98% of theoretical density. Pressures in excess of 6,000 p.s.i. are generally not necessary.

After the pressure is removed, it is preferred that the mold be promptly ejected from the hot zone of the hot pressing apparatus and allowed to cool rapidly to minimize grain growth within the billet. The pressed mass, i.e., the fused pressure-transmitting medium containing the hot pressed billet, is then ejected from the mold and the envelope of fused medium is broken to recover the compressed billet.

While the method of this invention is ordinarily most conveniently carried out utilizing rigid hot pressing molds, this method can as well be practiced by subjecting a sealed, deformable container containing one or more billets surrounded with one of the above-mentioned mixtures to elevated temperatures and isostatic pressure.

This invention is further illustrated by the following specific examples wherein all parts and percentages are by weight unless otherwise indicated.

Example 1

(A) A ball milled mixture of tungsten carbide and cobalt is prepared by milling for five days in a one-gallon steel mill loaded with 14,000 grams of ¼ inch cobalt-bonded carbide balls, a charge consisting of 1800 grams of fine tungsten carbide powder and 245 grams of finely divided cobalt powder having a grain size of about one micron, along with 1800 grams of acetone. The 8 inch diameter mill is run at 45 revolutions per minute for four days and the milled powder is recovered, dried and screened.

(B) 15 grams of a powder prepared according to the procedure of Example 1(A) is charged in a nitrogen atmosphere into a thin walled rubber mold having an inside diameter of ½ inch, an outside diameter of ⅝ inch and a length of 4 inches. The mold is evacuated, sealed and then isostatically pressed at 60,000 p.s.i. for one minute using water as the pressure-transmitting medium. This pressing operation is carried out at ambient temperatures. The resulting cold pressed rod is removed from the mold, again under a nitrogen atmosphere, and is sintered for 30 minutes at 1,200° C. under an atmosphere of hydrogen to yield a round, sintered rod which is ⅝ inch long and ⅜ inch in diameter and has a density of about 90% of theoretical.

(C) The inside wall of a cylindrical graphite mold four inches in length and having an inside diameter of 1⅛ inch and an outside diameter of three inches and two graphite pistons two inches long and 1⅛ inch in diameter are coated with a paste prepared by mixing about 10 grams of carbon black and about 50 milliliters of paraffinic hydrocarbon oil. The graphite parts are thoroughly heated before use to remove the oil. The carbon is used as a lubricant so that the pressure-transmitting medium can be ejected easily from the mold after hot pressing.

Seven parts by weight of minus 325 mesh calcium oxide and three parts of minus 200 mesh anhydrous calcium chloride are combined and blended by tumbling a V blender for one hour. Twenty-five grams of the resulting calcium oxide-calcium chloride mixture are cold pressed at about 100 p.s.i. in the lubricated graphite mold. After removing one graphite piston from the mold the sintered carbide billet obtained in Example 1(B) is centered on the pressed mixture, one of the end faces of the billet being in contact with the mixture. There are then added an additional 50 grams of the mixture, this being sufficient to fill the space between the billet and the mold and cover the top of the billet with a layer about ¼ inch deep. Finally, the piston is replaced and 100 p.s.i. cold pressure is applied to the mixture to thoroughly pack it around the billet.

The mold is then placed in the chamber of an induction-heated vacuum hot press furnace and the furnace is evacuated by means of a mechanical pump. When a 0.5 torr vacuum is reached the furnace is heated at a rate of 75° C. per minute to 1000° C. The mold is then moved into the hot zone of the furnace and the temperature is raised to 1400° C. at the same heating rate and maintained at 1400° C. for eight minutes to allow the billet and the mixture to equilibrate to the furnace temperature. Pressure is then applied to both pistons and increased at a uniform rate of about 330 p.s.i. per second until a pressure of 4000 p.s.i. is reached. This pressure is maintained for 10 minutes until the billet and the mixture cease to deform, as monitored by a time-deformation chart. An additional time of one minute is allowed to assure complete densification of the sample. The pressure is removed and the mold is allowed to cool.

The pressed mass is ejected from the mold using a hydraulic press. The pressed billet is recovered by breaking away the brittle calcium oxide-calcium chloride shell and leaching the rod in hot water to remove the salt. Examination of the billet shows that its original shape is not distorted although the overall dimensions are about 3½ percent less than those of the pre-sintered rod.

The billet is essentially free from pores and is about 99% of theoretical density. It has the strength, hardness and other properties typical of a cobalt-bonded tungsten carbide of this composition when prepared by conventional hot pressing.

Example 2

(A) Fifty grams of a cobalt-containing tungsten carbide powder similar to that obtained in Example 1(A) but containing 20% by weight of cobalt are loaded into a cylindrical graphite mold having a length of four inches, an outside diameter of three inches, a ¾ inch by ¾ inch cavity extending along its length and a close fitting graphite plate, approximately ¾ inch by ¾ inch square, situated in one end. A second graphite plate of the same dimensions is placed above the powder and close fitting graphite pistons are inserted into each end of the mold until they contact the graphite plates. The assembly is placed between the platens of a hydraulic press and the powder is pressed at 200 p.s.i. for one minute. The pistons are removed and the mold with graphite plates and compacted powder still in place is situated in a sintering furnace.

The mold and the contents are then heated for 30 minutes at 1200° C. under a hydrogen atmosphere. The hydrogen penetrates to the sample between the graphite plates and the internal walls of the mold. The resulting sintered billet, ⅝ inch by ⅝ inch by ¼ inch, has a density of about 87% of theoretical.

(B) Ten sintered billets prepared as described in Example 2(A) are all isostatically pressed in a single-cavity, cylindrical graphite mold having an internal diameter three inches and a length of ten inches. A three inch diameter plate or disc of graphite one-half inch thick is inserted into one end of the cavity which is held upright and a one inch layer of powdered mixture consisting of eight parts of powdered alumina and two parts of powdered potassium chloride is packed into the mold on the plate. Five billets are spaced evenly on the layer of powder, powder is poured around and over the billets to a depth of half an inch, another five billets are placed on this powder and more powder is poured around and over them to a depth of one inch. Then another disc is placed on the powder and the contents of the mold pressed at 100 p.s.i. as in Example 1(C). Hot-pressing is carried out as in Example 1(C) with the modification that a temperature of 1350° C. is employed and a pressure of 500 p.s.i. is applied for seven minutes.

The recovered billets have a density of over 99% of theoretical. They are diamond ground to ½ x ½ x ¾ inch cutting inserts and employed for machining a superalloy.

Example 3

About 10 grams of minus 250 mesh titanium nitride powder is isostatically pressed in a thin-walled rubber mold having an inside diameter of ½ inch, an outside diameter of ⅝ inch and a length of 3 inches as described in Example 1(B) utilizing a pressure of 100,000 p.s.i. The resulting 1½ inch long compact is sintered at 1,800° C. for one hour in an atmtosphere of cracked ammonia to yield a sintered rod having a density of about 85% of theoretical.

The sintered rod is isostatically hot pressed according to the procedure of Example 1(C) utilizing as the pressing medium a fine powdered mixture consisting of 85 parts of calcium oxide and 15 parts of calcium fluoride. The hot pressing temperature is 1,900° C. and the maximum pressure applied is 4,000 p.s.i. The density of the hot pressed billet obtained is about 95% of theoretical.

Example 4

A minus 325 mesh molybdenum silicide powder is isostatically pressed in a rubber mold of the same dimensions and in the same manner as described in Example 1(B) utilizing a pressure of 50,000 p.s.i. The resulting compact is sintered under vacuum at 1,500° C. for one hour to yield a sintered rod having a density of about 89% of theoretical.

The sintered rod is isostatically hot pressed according to the procedure of Example 1(C) utilizing as the pressing medium a powdered mixture consisting of 75 parts of minus 325 mesh magnesium oxide and 25 parts of minus 100 mesh magnesium fluoride, a hot pressing temperature of 1,750° C. and a maximum pressure of 6,000 p.s.i. The density of the hot pressed rod obtained is about 97% of theoretical.

Example 5

A minus 250 mesh titanium diboride powder is isostatically pressed in a rubber mold of the same dimension and in the same manner described in Example 1(B). A maximum pressure of 60,000 p.s.i. is utilized. The resulting compact is sintered at 1,700° C. for one hour under an atmosphere of argon to yield a sintered rod having a density of about 85% of theoretical.

The sintered rod is isostatically hot pressed according to the procedure of Example 1(C) utilizing as the pressing medium a powdered mixture consisting of 90 parts of minus 325 mesh magnesium oxide and 10 parts of minus 100 mesh magnesium fluoride, a hot pressing temperature of 1,900° C. and a maximum pressure of 4,000 p.s.i. The density of the hot pressed billet obtained is about 97% of theoretical.

Example 6

Fifteen grams of minus 350 mesh alumina powder is pressed in a graphite mold as described in Example 2(A). A pressure of only 5,000 p.s.i. is applied. The resulting compact is sintered in the graphite mold at 1,400° C. for one hour under vacuum to yield a sintered billet having a density of about 88% of theoretical.

This sintered billet is isostatically hot pressed according to the procedure of Example 1(C) utilizing a powdered mixture consisting of 75 parts of minus 200 mesh calcium oxide and 25 parts of minus 100 mesh calcium fluoride, a hot pressing temperature of 1,650° C. and a maximum pressure of 4,000 p.s.i. which is applied for ten minutes. The hot pressed billet obtained has a density of about 98% of theoretical.

Example 7

A minus 200 mesh powder consisting of eight parts of nickel, eight parts of molybdenum and 84 parts of titanium carbide is prepared by milling the component powders together in an acetone slurry for about five days, recovering the powder and drying and screening it through a 200 mesh screen. Twenty-five parts of this powder is pressed in a graphite mold to form a ¾ inch by ¾ inch compact as described in Example 2(A) using a maximum pressure of 1,000 p.s.i. The compact is vacuum sintered in the graphite mold at 1,300° C. for one-half hour. The resulting sintered billet has a density of about 90% of theoretical.

The sintered billet is isostatically hot pressed by the procedure of Example 1(C) using as the pressing medium a powdered mixture consisting of 85% mullite and 15% potassium chloride, a hot pressing temperature of 1,450° C. and a maximum pressure of 3,000 p.s.i. The hot pressed billet obtained has a density of about 99% of theoretical.

Example 8

Twenty grams of minus 250 mesh cerium sulfide powder is pressed in a graphite mold according to the procedure of Example 2(A) to form a ¾ inch by ¾ inch compact which is vacuum sintered in the mold at 1,600° C. for one-half hour. The resulting sintered billet has a density of about 85% of theoretical.

The sintered billet is isostatically hot pressed according to the procedure of Example 1(C) utilizing as the pressing medium a homogenous powdered mixture consisting of 90 parts of minus 100 mesh zirconium oxide and 10 parts of minus 100 mesh magnesium fluoride, a hot pressing temperature of 1,850° C. and a pressure of 4,000 p.s.i. which is applied for eight minutes. The hot pressed billet obtained has a density of about 95% of theoretical.

Example 9

Fifty grams of a homogenous, minus 150 mesh powder consisting of 72 parts tungsten carbide, 10 parts of tantalum carbide and 9 parts of titanium carbide and 9 parts of cobalt, prepared by milling the component powders together in an acetone slurry for five days, recovering and drying the powder and screening it, is pressed in a graphite mold according to the procedure of Example 2(A) to form a ¾ inch by ¾ inch compact. The compact is vacuum sintered in the graphite mold at 1,250° C. for one-half hour to yield a billet having a density of about 87% of theoretical.

This sintered billet is isostatically hot pressed according to the procedure of Example 1(C) utilizing as the pressure transmitting medium a homogenous powdered mixture consisting of 80 parts of minus 200 mesh magnesium oxide and 20 parts of minus 100 mesh calcium chloride, a hot pressing temperature of 1,450° C. and a maximum pressure of 4,000 p.s.i. which is applied for five minutes. The hot pressed billet obtained has a density of about 99% of theoretical.

Example 10

About 20 grams of a minus 325 mesh titanium carbide powder is isotatically pressed in the thin-walled rubber mold as described in Example 1(B) utilizing a pressure of 50,000 p.s.i. The resulting compact which is 1½ inches long and ½ inch in diameter is vacuum sintered at 1,700° C. for one hour to yield a sintered rod having a density of about 85% of theoretical.

The sintered rod is isostatically hot pressed according to the procedure of Example 1(C) utilizing as the pressure transmitting medium a homogenous powder mixture consisting of 80 parts of minus 200 mesh calcium oxide and 20 parts of minus 100 mesh calcium fluoride, a hot pressing temperature of 1,800° C. and a maximum pressure of 4,000 p.s.i. which is applied for five minutes. The hot pressed billet obtained has a density of about 98% of theoretical.

Example 11

A thin walled rubber mold is produced by dipping a conventional drill bit five inches long and one-half inch in diameter into a rubber latex, withdrawing the bit and, after the latex coating has dried, peeling the rubber from the bit.

This mold is then utilized in a repetition of Examples 1(B) and (C). All the contours of the bit used to produce the rubber mold are duplicated in the hot pressed billet obtained without substantial distortion and little finish-grinding is required. The diameter and the length of the billet are respectively about 40% and about 25% less than the diameter and length of the bit.

Example 12

Example 2(B) is repeated with the modification that the mixture utilized as the pressure-transmitting medium consists of eight parts of powdered, anhydrous alumino silicate and two parts of sodium chloride. The anhydrous alumino silicate is prepared by firing minus 200 mesh kaolin clay at 600° C. to drive off water.

The hot pressed billet obtained has a density of about 99% of theoretical.

Example 13

Example 1(C) is repeated with the modification that the mixture utilized as the pressure-transmitting medium consists of seven parts of minus 300 mesh $FeAl_2O_4$ (a spinel) and three parts of minus 200 mesh anhydrous calcium chloride. The billet is substantially identical to that obtained in Example 1(C).

Example 14

Example 2(B) is again repeated with the modification that sodium silicate glass having a $SiO_2:Na_2O$ ratio of 3.25:1 is substituted for the potassium chloride in the mixture utilized as the pressure-transmitting medium. The hot pressed billet again has a density of about 99% of theoretical.

I claim:
1. A method of isostatically hot pressing a porous refractory body fabricated by powder metallurgical techniques comprising the steps
   (a) surrounding the body with a mixture consisting essentially of from about 5 to about 40% by weight of a first component selected from the group consisting of alkali metal chlorides, fluorides and silicates; alkaline earth metal chlorides, fluorides and silicates; and mixtures thereof and from about 60 to about 95% by weight of a second component selected from the group consisting of silica, alumina, zirconia, magnesia, calcium oxide, spinels, mullite, anhydrous alumino silicates and mixtures thereof;
   (b) heating said mixture to a temperature at which it is plastic; and
   (c) while maintaining said temperature applying to said mixture sufficient pressure to increase the density of said body.
2. The method of claim 1 wherein substantially all surface pores in said body are originally less than 100 microns in diameter.
3. The method of claim 1 wherein substantially all surface pores in said body are originally less than 50 microns in diameter.
4. The method of claim 1 wherein substantially all surface pores in said body are less than 10 microns in diameter.
5. The method of claim 1 wherein said pressure is sufficient to increase the density of said body to at least 98% of theoretical.
6. The method of claim 1 wherein said first component is calcium chloride and said second component is calcium oxide.
7. The method of claim 6 wherein substantially all surface pores in said body are originally less than 100 microns in diameter.
8. The method of claim 6 wherein substantially all surface pores in said body are originally less than 50 microns in diameter.
9. The method of claim 6 wherein substantially all surface pores in said body are originally less than 10 microns in diameter.
10. The method of claim 1 wherein said body comprises from about 70% to about 97% by weight of a metal carbide selected from the group consisting of tungsten carbide, tantalum carbide, titanium carbide, niobium carbide and mixtures thereof and from about 3% to about 30% by weight of a binder metal selected from the group consisting of iron, cobalt, molybdenum, nickel nad alloys thereof.
11. The method of claim 10 wherein substantially all surface pores in said body are originally less than 100 microns in diameter.
12. The method of claim 11 wherein said first component is calcium chloride and said second component is calcium oxide.
13. The method of claim 1 wherein said body comprises from 85% to 94% by weight of tungsten carbide and from 6% to 15% by weight of cobalt.
14. The method of claim 13 wherein substantially all surface pores in said body are originally less than 100 microns in diameter.
15. The method of claim 14 wherein said first component is calcium chloride and said second component is calcium oxide.

References Cited

UNITED STATES PATENTS

| | | | |
|---|---|---|---|
| 2,510,546 | 6/1950 | Brennan | 75—223 X |
| 2,568,157 | 9/1951 | Lepp | 75—223 X |
| 2,928,733 | 3/1960 | Wagner | 75—223 X |
| 3,279,917 | 10/1966 | Ballard | 75—226 |
| 3,284,195 | 11/1966 | Googin | 75—226 |
| 3,344,209 | 9/1967 | Hague | 75—226 X |

CARL D. QUARFORTH, Primary Examiner

U.S. Cl. X.R.

75—205, 223, 226